United States Patent [19]

Ikawa

[11] 4,113,810
[45] Sep. 12, 1978

[54] DISTILLATION COLUMN PACKING

[75] Inventor: Reiji Ikawa, Tokyo, Japan

[73] Assignee: Tokyo Special Wire Netting Co., Ltd., Tokyo, Japan

[21] Appl. No.: 809,329

[22] Filed: Jun. 23, 1977

[30] Foreign Application Priority Data

Jul. 2, 1976 [JP] Japan .................................. 51-78733

[51] Int. Cl.² .............................................. B01F 3/04
[52] U.S. Cl. ...................................... 261/98; 202/158; 249/154; 261/DIG. 72
[58] Field of Search ...................... 261/94–98, 261/DIG. 72; 210/150, 151; 202/158; 249/154, 117; 425/DIG. 121; D23/1-4; 55/90-92

[56] References Cited

U.S. PATENT DOCUMENTS

| D. 232,236 | 7/1974 | LaBorde .................................. D23/4 |
| 1,816,945 | 8/1931 | Wood ...................................... 249/154 |
| 3,030,259 | 4/1962 | Long ............................ 425/DIG. 121 |
| 3,429,654 | 2/1969 | Friedrichsen et al. ....... 261/DIG. 72 |
| 3,618,910 | 11/1971 | Arndt ...................................... 261/94 |
| 3,758,087 | 9/1973 | Hoon, Jr. ................................ 261/94 |
| 3,914,351 | 10/1975 | McKeown et al. .................... 261/98 |
| 3,957,931 | 5/1976 | Ellis et al. ............................. 210/150 |
| 4,067,936 | 1/1978 | Ellis et al. ................................ 261/98 |

FOREIGN PATENT DOCUMENTS

| 2,313,287 | 9/1974 | Fed. Rep. of Germany ... 261/DIG. 72 |
| 5,210,104 | 3/1977 | Japan .............................. 261/DIG. 72 |

*Primary Examiner*—Richard L. Chiesa
*Attorney, Agent, or Firm*—Blanchard, Flynn, Thiel, Boutell & Tanis

[57] ABSTRACT

A distillation column packing in the form of a spherical body constructed by assembling a pair of hemispherical members of the same shape and structure. Each of the hemispherical members includes a suitable number of cutout openings formed in the hemispherical surface portion thereof to leave covering portions, a plurality of mating assembly posts and tubes formed in the hollow inside of the hemispherical member, and reinforcing and gas-liquid contact area increasing contact pieces formed to connect the posts and the tubes with one another but not to close the hollow inside of the hemispherical member. The packing thus constructed is best suited for use in distillation columns.

2 Claims, 6 Drawing Figures

DISTILLATION COLUMN PACKING

The present invention relates to a packing best suited for use in chemical distillation columns, and more particularly the invention relates to a packing in the form of a spherical body and constructed by assembling a pair of hemispherical members each having a specially designed internal structure.

The distillation process is traditionally known in the art as the method for separating of the individual components from various mixtures by utilizing the differences in their vapor pressures. In particular, in the chemical industry, a variety of distillation columns have been developed, and paralleling this development many different types of packings for filling the insides of such distillation, have also been developed. For instance, the packings now in wide use include wire mesh packings such as McMahon packing and Dixon packing, wire packings such as Helix packing, metal plate, synthetic resin and ceramic packings such as Raschig rings, glass packings such as Heli pack, and so on. While, in actual use, a packing of a suitable material, shape and structure is used by taking into account the type of mixture to be distilled, the cross-sectional area and packed height of the distillation column and other conditions, generally speaking the packing used is required to satisfy the following properties in all cases. The packing must meet a number of requirements, namely, improved gas-liquid contact property, reduced pressure drop, elimination of any space between the pieces of packing placed in the distillation column, greater strength, lower manufacturing cost, etc. Of the above-mentioned various known types of packings, the spherical types have heretofore been considered superior in view of these required properties and have been used widely. However, so far as is known to the inventor, these conventional spherical packings are all disadvantageous in that they are complicated in construction, are difficult to manufacture and include portions which are weak in strength so that when a large number of pieces of the packing are packed in a column, there is the danger that the packing pieces will be damaged under the effect of their own weight.

In view of these circumstances, the inventor has developed a novel spherical packing which eliminates the foregoing deficiencies in the prior art. More specifically, it is an object of this invention to provide a distillation column packing of spherical shape which is divided into two hemispherical parts so that a desired spherical packing can be very easily assembled and constructed by joining together two hemispherical members each thereof being relatively simple in structure but having a high degree of strength and being identical in shape and construction with each other, thus permitting their respective projections and recesses to engage with one another.

It is another object of this invention to provide such distillation column packing modified in shape and construction so that the assembled spherical body can ensure satisfactory gas-liquid contact, have a sufficient strength and can practically prevent the occurrence of any filling gap between the spherical bodies packed in a distillation column.

The above and other objects, advantages and features of this invention will become more apparent from the following detailed description taken in conjunction with the accompanying drawings, in which.

Figure 1:
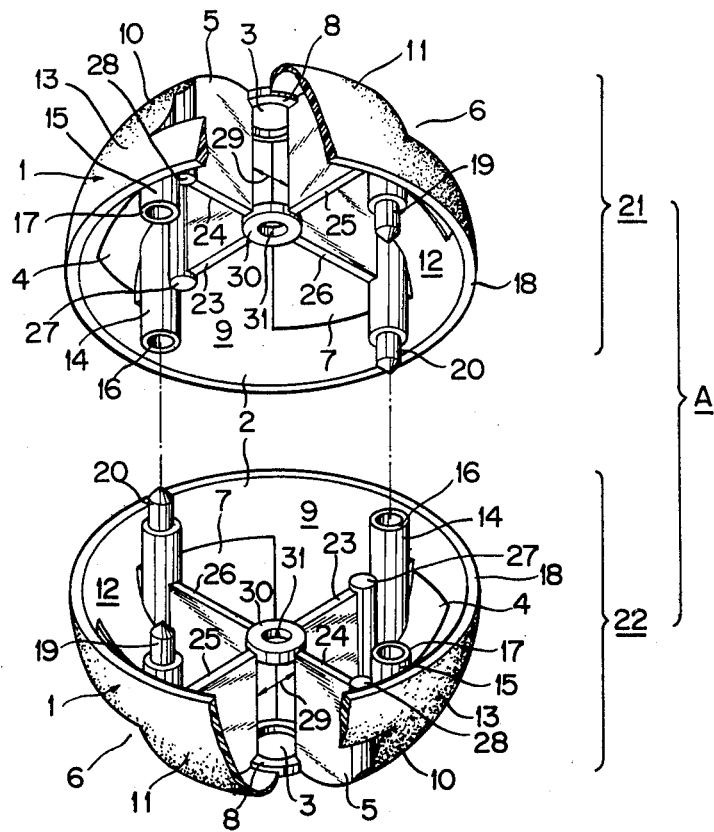
FIG. 1 is a schematic exploded view showing the construction and manner of assembly of the pair of the exploded hemispheric members which mate to define a spherical distillation column packing according to this invention.

Referring now to the drawings, the spherical distillation column packing (hereinafter simply referred to as a "spherical body") and its manufacturing mold apparatus according to the invention will now be described in greater detail. The spherical body(A) is composed of a pair of hemispherical members which are identical in shape and structure. Thus, for purposes of discussion, only one of the hemispherical members (the upper hemispherical member in FIG. 1) will be described in detail and the other member will not be described. In the drawings, the identical parts of the two hemispherical members are designated by the identical reference numerals.

Figure 2:
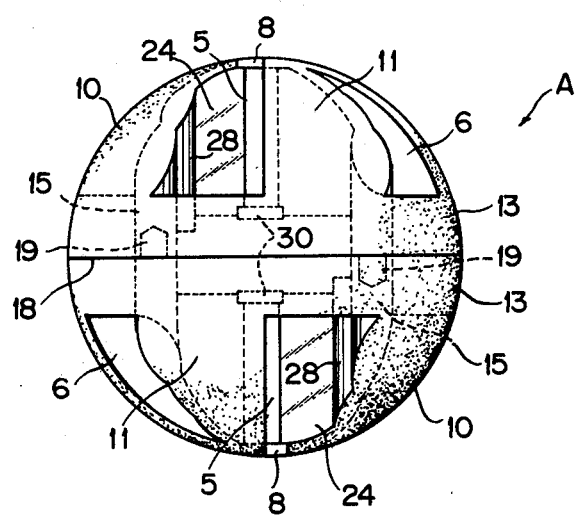
FIG. 2 is a front view of the spherical distillation column packing made by assembling the parts shown in FIG. 1.
Figure 3:
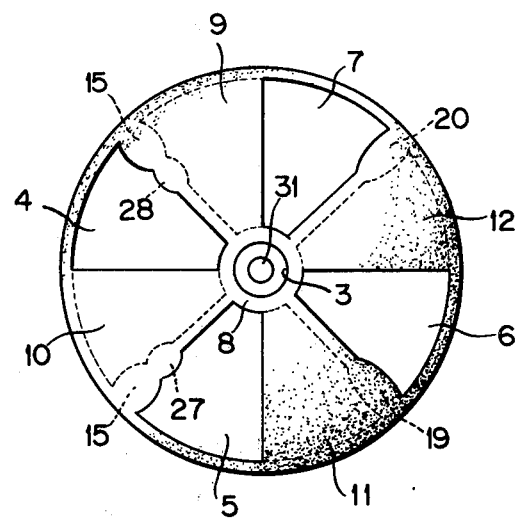
FIG. 3 is a plan view of the hemispherical member shown in FIG. 1.

Referring first to FIGS. 1 to 3, numeral 1 designates a bowl-shaped hemispherical member made of a thermoplastic synthetic resin having its bottom formed into an open end or face 2 and having a through-hole 3 at its top. Numerals 4, 5, 6 and 7 designate cutout openings radially extending from a ring portion 8 on the outer periphery of the hole 3. These cutout openings are formed so as to be arranged alternately with covering sections 9, 10, 11 and 12 and the openings extend to the mid point of the outer surface of the hemispheric member 1 to thereby leave an annular wall portion 13 adjacent the open face 2 direction. Numerals 14 and 15 designate engaging tubes having corresponding one ends thereof secured to the inner surfaces of the covering portions 9 and 10 and formed to extend to the annular portion 13. These engaging tubes 14 and 15 are positioned slightly inwardly of the hemispherical member 1 with their respective extension direction end edges 16 and 17 being positioned to be substantially flush with the bottom edge 18 of the hemispheric member 1. Numerals 19 and 20 designate engaging posts similarly having corresponding one ends thereof secured to the inner surfaces of the covering positions 11 and 12. The posts 19 and 20 are positioned slightly inwardly of the hemispherical member 1 and have a diameter and shape adapted to be fitted into the engaging tubes 14 and 15 and they project outwardly of the bottom edge 18 of the hemispheric member 1. The engaging tubes 14 and 15 and the engaging posts 19 and 20 are provided in the positions opposing one another, utilized for providing engagement between one subassembly 21 and the other subassembly 22 which will be described later, and these are of the same number. Numerals 23, 24, 25 and 26 designate contact pieces having end edges thereof respectively secured to the engaging posts 19 and 20 and reinforcing posts 27 and 28 of the engaging tubes 14 and 15. The contact pieces 23, 24, 25 and 26 project inwardly of the hemispherical member 1, and their forward end edges are positioned opposite to each other so as to define a suitable facing space 29 formed not to close the inner space of the hemispheric member 1. Numeral 30 designates a connection piece connecting the contact pieces 23, 24, 25 and 26 to one another with the facing space 29 therebetween, and the connecting piece is formed into circular shape with a through-hole 31 formed in the central portion thereof.

Figure 4:
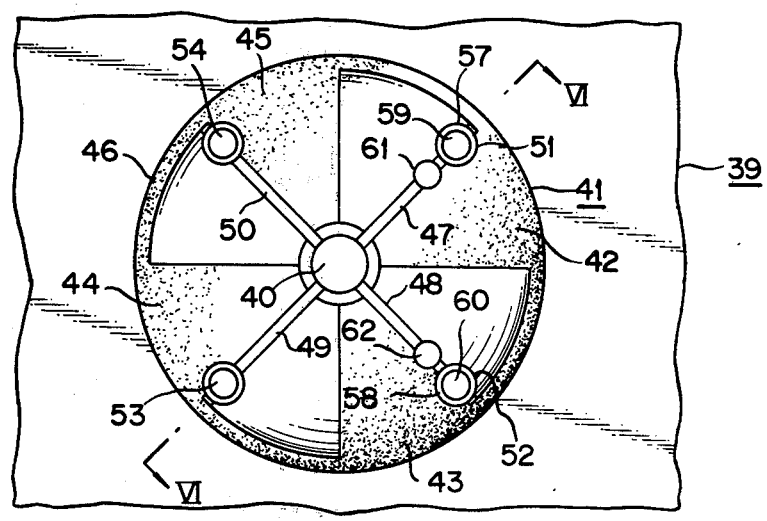
FIG. 4 is a plan view of a male mold for making the hemispherical members.
Figure 5:
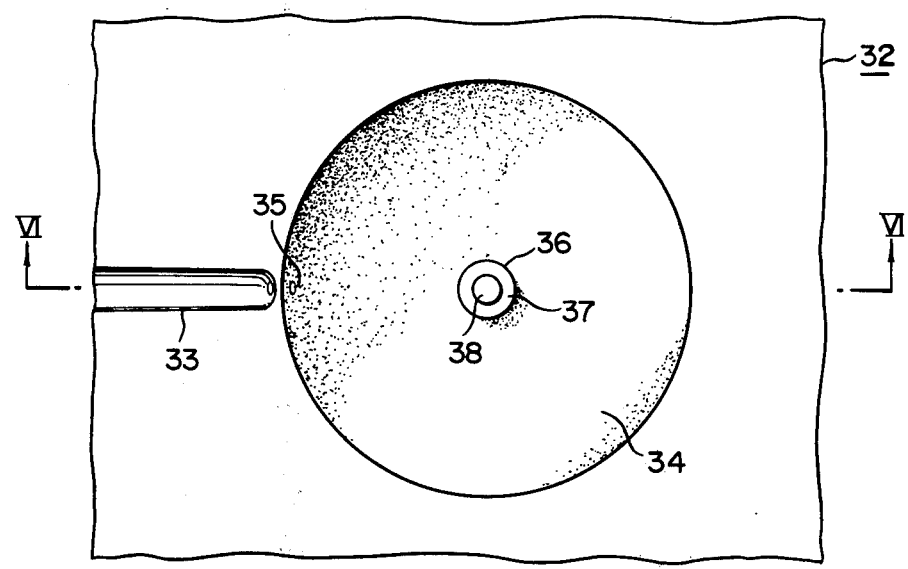
FIG. 5 is a plan view of a female mold adapted for use in combination with the male die shown in FIG. 4, as viewed in the arrow direction of the line V—V in FIG. 6.
Figure 6:
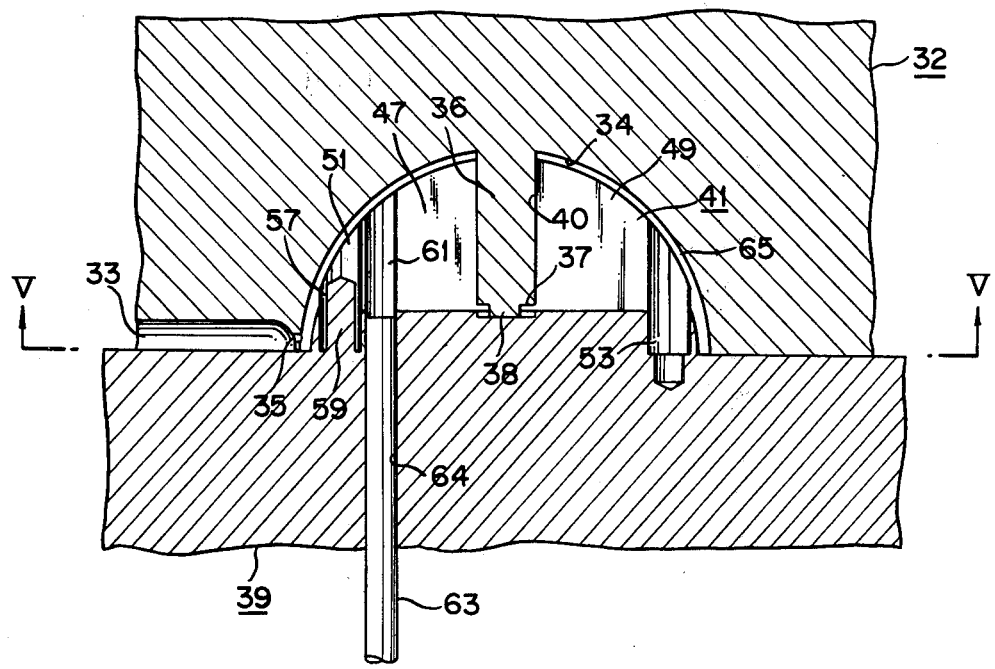
FIG. 6 is a longitudinal sectional view of the assembled male and female molds, as viewed in the arrow direction of the line VI—VI in FIGS. 4 and 5.

Next, referring to FIGS. 4 to 6, numeral 32 designates a female mold with an inlet passage 33 for introducing molten material such as thermoplastic synthetic resin or the like, and the female die includes a hemispherical cavity 34, an inlet port 35 formed in the cavity 34 to communicate with the inlet passage 33, a pillar projection 36 formed in the central portion of the cavity, and a stepped portion 37 and a projection 38 formed at the outer end of the pillar projection 36 for making the connecting piece 30. Numeral 39 designates a male die including a centrally formed pillar impression 40 corresponding to the pillar projection 36 and a hemispherical forming projection 41 protruded outwardly so as to correspond to the cavity 34 of the female mold 32. The male mold 39 is also formed with impressions 42, 43, 44 and 45 which are suitably spaced from each other and radially extended from the pillar impression 40 as a central axis, and the lower ends of the impressions 42, 43, 44, and 45 form an annular impression 46 along the outer periphery of the forming projection 41. Numerals 47, 48, 49 and 50 designate slits having their upper ends adjoining the impressions 42, 43, 44 and 45 and the lower ends vertically extended to the upper plane of the annular impression 46, and also having their inner ends communicated with the pillar impression 40 and their outer ends respectively formed with cylindrical engagement impressions 51, 52, 53 and 54, of which the engagement impressions 51 and 52 are respectively provided with core projections 59 and 60 to leave suitable feeding spaces 57 and 58 between the inner surfaces thereof and the core projections 59 and 60. Numeral 61 and 62 designate impressions for forming the reinforcing posts 27 and 28, which are provided to respectively adjoin the engagement impressions 51 and 52 with the core projections 59 and 60, and a sliding hole 64 for a pusher rod 63 is formed to connect with the lower ends of the hole 61.

With the thus constructed male and female molds 39 and 32 fitted together, a molten liquid of thermoplastic resin is poured under pressure into the inlet passage 33 for feed material, thus introducing the molten resin into the mating portions of the male and female molds 39 and 32 through the inlet post 35. A filling space 65 defined between the impressions 42, 43, 44 and 45 and the annular impression 46 of the male mold 39 and the inner surface of the cavity 34 of the female mold 32 forms covering portions 9, 10, 11 and 12 and an annular portion 13 of the hemispheric member 1. The slits 47, 48, 49 and 50 form contact pieces 23, 24, 25 and 26 of the hemispherical member 1, while the pillar projection 36 forms a facing space 29 at the inner ends of the contact pieces 23, 24, 25 and 26, and the forward end stepped portion 37 and projection 38 form a connecting piece 30 of the ring with a through-hole 31. The engagement impressions 51 and 52 with the core projections 59 and 60 form engaging tube 14 and 15 of the hemispheric member 1, and the other engagement impressions 53 and 54 form engaging posts 19 and 20. After the resin solution has cured, the male and female dies 39 and 32 are disengaged and the pusher rod 63 is pressed and slid toward the forming hole 61 in any desired manner, thus separating the hemispheric member 1 from the male die 39 and thereby providing one subassembly 21 of a spherical body. By forming in the same way another subassembly 22 of the same shape and structure and securely coupling it to the subassembly 21 by means of their associated engaging tubes 14 and 15 and engaging posts 19 and 20, a spherical distillation column packing is obtained.

Since the distillation column packing of the present invention has a spherical shape, even though a large number of them are packed and randomly positioned in a packed column, contrary to the case using packing materials of square shape, there is no possibility of the individual pieces irregularly engaging one another thus allowing uniform filling of the column with the packing, and moreover there is no possibility of causing a filling gap between the individual pieces. In addition, the provision of the cutout openings and through-holes has the effect of minimizing the pressure drop and preventing the liquid from remaining within the spherical bodies, and moreover the vapor can enter into the spherical bodies thus allowing both surfaces of the spherical bodies to entirely serve as liquid-gas contact surfaces. Further, the provision of the contact pieces has the effect of increasing the gas-liquid contact area and increasing the free volume. Still further, the fact that the contact pieces are connected with one another by the connecting piece has the effect of increasing the resistance of the spherical bodies against externally applies forces and also preventing deformation of the spherical bodies packed in the lower portion of the packed column. Still further, since the pair of subassemblies of the spherical body are of the same shape and structure and adapted to be fitted and fastened to each other by means of their associated engaging tubes and posts, only one type of mold device is required for manufacturing the necessary packing and the products thus obtained are also inexpensive.

Still furthermore, since the engaging parts of the male and female dies of this manufacturing apparatus are reduced to ensure a simple combination, the desired packing can be quickly manufactured with the simplified shapes.

What is claimed is:

1. A spherical distillation column packing comprising an assembly of one subassembly joined to another subassembly of the same structure as said one subassembly, each of said subassemblies being formed of a hemispherical body having a bowl-like shape and an open end, said hemispherical body including a through-hole formed in the top thereof, a plurality of cutout openings and covering portions formed alternately in the side surface of said hemispherical body, an engaging tube formed on the inner surface of one of said covering portions, an engaging post formed on the inner surface of a different one of said covering portions, said engaging post being shaped to fit into the engaging tube of the other subassembly, a plurality of contact pieces each having one end thereof secured to the outer side of the associated one of said engaging tubes and posts and projecting inwardly of said hemispherical body, said contact pieces having the inner end edges thereof opposed to and spaced from other to define a spacing therebetween so as to not close the interior of said hemispherical body, and a connecting piece connecting the inner end edges of said contact pieces with one another.

2. A spherical distillation column packing consisting essentially of two identical unitary hemispherical bodies which are joined together to form the spherical packing, each of said bodies comprising a concavo-convex exterior wall having an equatorial base edge and an apex, means defining a central through opening at said apex, a continuous wall portion extending from said equatorial base edge partway to said apex and a plurality of circumferentially spaced-apart wall sections having the shape of segments of a sphere and extending from said continuous wall portion to said means defining said central through opening, the spaces between said wall sections defining circumferentially spaced-apart openings through said exterior wall of said body; a plurality of circumferentially spaced-apart radially extending ribs on the interior of said concavo-convex exterior wall, the radially inner edges of said ribs being radially spaced from each other to define therebetween an open zone communicating with said central through opening and a connecting piece joining together said radially inner edges of said ribs at the axially inner corner thereof, the upper edges of said ribs being joined to and conforming to the shape of the interior surface of said wall sections of said concavo-convex exterior wall and the lower edges of said ribs being axially spaced from said equatorial base edge, at least one engaging tube formed in one of said ribs and projecting axially therefrom toward said equatorial base edge, at least one engaging post formed in another of said ribs and projecting axially therefrom toward said equatorial base edge, the tubes of one of said bodies receiving the posts of the other body and vice versa so that the bodies are secured together to form a sphere.

* * * * *

UNITED STATES PATENT AND TRADEMARK OFFICE
CERTIFICATE OF CORRECTION

PATENT NO. : 4 113 810
DATED : September 12, 1978
INVENTOR(S) : Reiji Ikawa

It is certified that error appears in the above-identified patent and that said Letters Patent are hereby corrected as shown below:

Column 4, line 67; after "from" insert ---each---.

Signed and Sealed this

Eighteenth Day of March 1980

[SEAL]

Attest:

SIDNEY A. DIAMOND

Attesting Officer

Commissioner of Patents and Trademarks